United States Patent [19]

Bowlin

[11] Patent Number: 5,350,272
[45] Date of Patent: Sep. 27, 1994

[54] AUTOMATIC STICK LAYING APPARATUS

[76] Inventor: William P. Bowlin, 9372 Bowlin Dr., Shreveport, La. 71129

[21] Appl. No.: 962,902

[22] Filed: Oct. 19, 1992

Related U.S. Application Data

[63] Continuation-in-part of Ser. No. 839,478, Feb. 19, 1992, Pat. No. 5,263,812, which is a continuation-in-part of Ser. No. 733,665, Jul. 22, 1991, Pat. No. 5,246,333.

[51] Int. Cl.$^5$ .......................................... B65G 57/18
[52] U.S. Cl. ............................. 414/789.5; 414/786; 414/793.6; 414/794.3
[58] Field of Search .................. 414/786, 789.5, 793.6, 414/794.3

[56] References Cited

U.S. PATENT DOCUMENTS

| | | | |
|---|---|---|---|
| 2,928,559 | 3/1960 | Mosely | 414/789.5 |
| 3,352,434 | 11/1967 | Zuercher | 414/789.5 |
| 4,144,976 | 3/1979 | Rysti | 414/789.5 |
| 4,229,133 | 10/1980 | Johnson | 414/789.5 |
| 4,360,303 | 11/1982 | Rysti | 414/789.5 |
| 4,610,360 | 9/1986 | Forslund | 414/789.5 |
| 4,801,233 | 1/1989 | Ritola | 414/789.5 |
| 4,810,152 | 3/1989 | Gillingham et al. | 414/789.5 |
| 4,878,803 | 11/1989 | Whiddon | 414/789.5 |

Primary Examiner—Michael S. Huppert
Assistant Examiner—Janice Krizek
Attorney, Agent, or Firm—John M. Harrison

[57] ABSTRACT

An automatic stick laying apparatus having retainer arm assemblies for retaining spacing sticks in position on stacked tiers of lumber. The automatic stick laying apparatus is designed to successively position the spacing sticks on stacks of lumber for spacing the lumber. In a preferred embodiment the stick laying apparatus includes a fixed frame designed for positioning over the lumber, a spacing stick accumulator mounted on the fixed frame and a carriage assembly attached to the fixed frame in vertically movable relationship. The accumulator includes a pair of spaced, horizontal accumulator chains fitted with accumulator chain cleats located above spaced drop gates for receiving and deploying the spacing sticks in a continuous loop. The carriage assembly is fitted with parallel chain channels supporting horizontal positioner chains having positioner chain cleats for receiving the spacing sticks from the accumulator through the drop gates and positioning the spacing sticks over respective layers of lumber. The retainer arm assemblies are spaced between the chain channels and serve to retain the spacing sticks on tile positioner chain cleats until the proper spacing stick displacing interval is achieved. Multiple pivoting diverter assemblies are also spaced between the chain channels for sequentially displacing selected spacing sticks on or from the positioner chain cleats after release by the retainer arm assemblies, to facilitate depositing these spacing sticks in selectively spaced relationship on the underlying tiers of stacked lumber by advancement of the positioner chains. The automatic stick laying apparatus may be connected to a programmable controller for automatic operation.

26 Claims, 6 Drawing Sheets

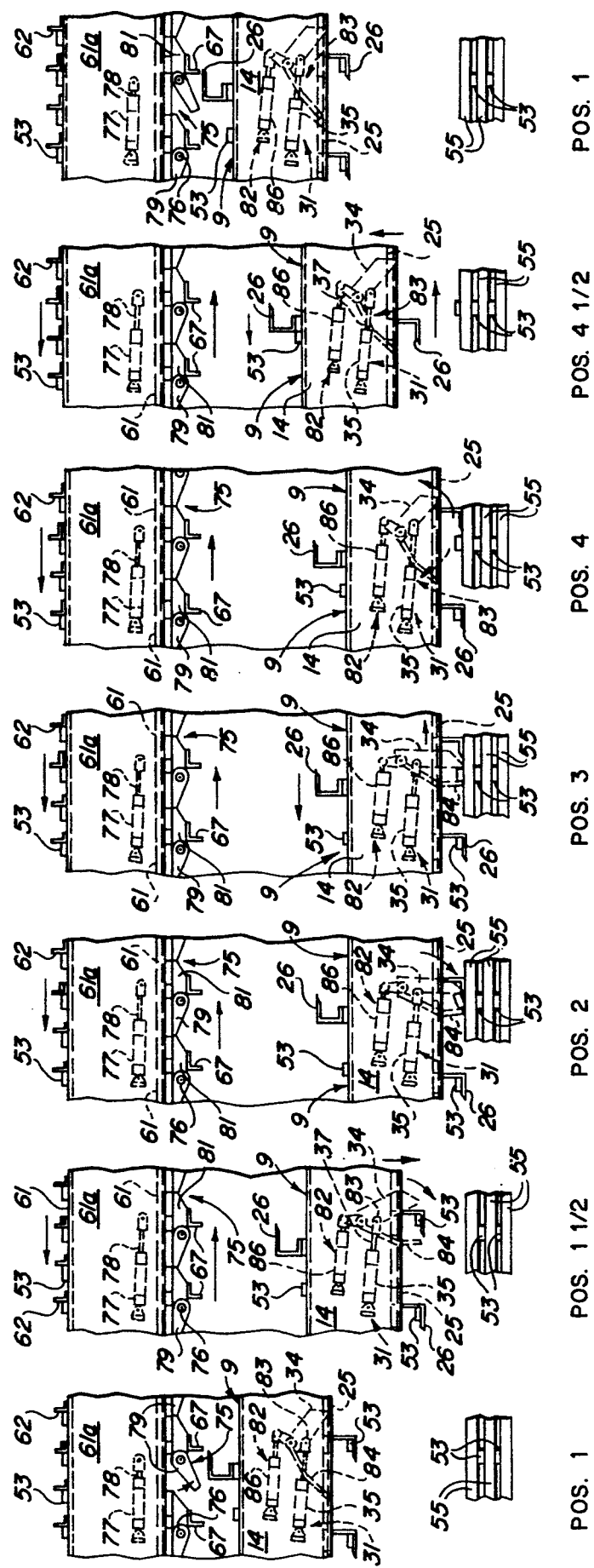

AUTOMATIC STICK LAYING APPARATUS

BACKGROUND OF THE INVENTION

1. Cross-Reference to Related Applications

This application is a continuation-in-part of my copending U.S. patent application Ser. No. 07/839,478, filed Feb. 19, 1992, now U.S. Pat. No. 5,246,333 which is a continuation-in-part of my copending U.S. patent application, Ser. No. 07/733,665, filed Jul. 22, 1991, now U.S. Pat. No. 5,246,333.

2. Field of the Invention

This invention relates to stacking of wood such as lumber and plywood for drying or other purposes and more particularly, to retainer arm assemblies provided in an automatic stick laying apparatus for maintaining spacing sticks in position for positioning the spacing sticks on stacked tiers of lumber in selectively spaced relationship to provide proper ventilation between the respective layers or tiers of lumber.

At a very early date it became obvious that lumber must be cured prior to use in order to avoid, or at least minimize, warping due to drying. In the early sawmill days "green" lumber was stacked in "ricks" which defined an inverted "V" configuration, where it was air-dried to reduce the moisture content and provide reasonably straight boards for building purposes. With the development of modern sawmills, the rate of processing and drying or curing of "green" lumber increased to the point that it became impractical and unprofitable to stack lumber in this "rick drying" fashion, and other techniques were devised to accomplish this purpose. The lumber is now stacked for kiln drying or air drying and the stacking is preferably accomplished in multiple rows and layers or tiers by inserting between each tier or layer of boards a number of small spacing sticks which keep the layers spaced and provide ventilating passages through the stack to expose both the upper and lower surfaces of the boards in the stack to the drying air. This procedure serves the purpose of processing a large number of boards of selected size in a relatively short period of time, thereby providing more favorable sawmill economics.

3. Description of the Prior Art

The stacking of lumber has been accomplished by various apparatus and techniques in modern times. U.S. Pat. No. 2,928,559, dated Mar. 15, 1960, to D. E. Mosely, details a "Lumber Stacker" which includes a mechanism for receiving boards from a source of supply, gathering the boards in layers and depositing the layers on the stack being formed and further including a mechanism for inserting multiple spacing sticks between each layer as the lumber is stacked, to space the layers in tiers. U.S. Pat. No. 3,352,434, dated Nov. 15, 1967, to W. H. Zuercher, details a "Stick Placer Apparatus". The device features a constant feed of sticks on slats from a removable cartridge to insert the stick between successive layers of a stack of lumber and space the lumber for drying. A "Lumber Spacer and Stick Layer" is detailed in U.S. Pat. No. 4,229,133, dated Oct. 21, 1980, to Charles L. Johnson. The lumber spacer automatically separates lumber in parallel alignment, drops spacer sticks on top of the stacked lumber and subsequently stacks more lumber on top of the spaced sticks. U.S. Pat. No. 4,360,303, dated Nov. 23, 1982, to Alpo Rysti, details a "Method and Apparatus for Locating Spacer Strips Between Layers of Timber Packages". The device positions spacer strips between vertically adjacent layers of timber by locating multiple spacer strips supported by distribution members over the top layer of the timber package and activating multiple depressers, which are operatively associated with a frame structure, downwardly to engage respective spacer strips and guide the strips into position on the top layer of the timber package. U.S. Pat. No. 4,610,360, dated Sep. 9, 1986, to H. Forslund, details an "Installation for Stacking Piles of Lumber Separated by Sticks". The device includes a number of sink compartments adapted to receive various types of lumber and a lumber conveyor designed to bring lumber from a loading point for unsorted lumber to the sink department. The lumber conveyor also transports sticks to the sink compartment for separation of the lumber in stacked tiers. A "Sticker Placer Apparatus" is detailed in U.S. Pat. No. 4,801,233, dated Jan. 31, 1989, to Edward Ritola. The apparatus includes multiple inclined sticker feed pockets designed to hold facing sticks and adapted to displace one stick at a time from the mouth of the sticker pocket to a variable height of lumber beneath the pocket. U.S. Pat. No. 4,810,152, dated Mar. 7, 1989, to Larry A. Gillingham, et al, details a "Sticker Positioning Apparatus for Use With Lumber Stacker". This apparatus includes an unscrambling conveyor that feeds six spacers from a bulk supply to a crowder feed conveyor, in order to supply sticks to a timed release mechanism. The release mechanism is operated by a cam device to sequentially present the individual spacer sticks in timed fashion to an endless distribution conveyor, where they are moved to the top of a lumber stack and accurately positioned in spaced relationship on the lumber. "A Stick Delivery Apparatus" is detailed in U.S. Pat. No. 4,878,803, dated Nov. 7, 1989, to Wade Q. Whiddon. The device includes a frame, a stick conveyor supported on the frame for movement between a stick supply station and a stick transfer station. The stick conveyor includes structure for transporting sticks from the supply station and for delivering the sticks to the transfer station in spaced, parallel relationship and additional apparatus is provided for replacing the sticks on stacked lumber beneath the frame.

It is an object of this invention to provide retainer arm assemblies in an automatic stick laying apparatus for mounting over stacks of lumber, plywood or pressboard and maintaining spacing sticks in position for automatically placing spacing sticks on each successive layer or tier of lumber, plywood or pressboard in preselected, spaced relationship to facilitate drying or other disposition of the vertically spaced lumber, plywood or pressboard.

Another object of this invention is to provide multiple, spaced retainer arm assemblies in an automatic stick laying apparatus, which apparatus is characterized by a fixed frame, an accumulator mounted on the fixed frame for receiving and accumulating multiple spacing sticks, one or more drop gates attached to the fixed frame below the accumulator and a carriage assembly movably mounted on the fixed frame and fitted with parallel chain channels provided with positioner chains having spaced positioner chain cleats for receiving spacing sticks from the accumulator and drop gate(s). The retainer arm assemblies operate with multiple, spaced diverter assemblies attached to the chain channels for retaining the spacing sticks on the positioner chain cleats and allowing sequential displacement of the spacing sticks from the positioner chain cleats, respectively, and relocating the spacing sticks in selected spaced relationship on successive stacks of lumber located beneath the stick laying apparatus by sequential limited advancement of the positioner chains.

Yet another object of this invention is to provide an automatic stick laying apparatus characterized by a fixed frame, an accumulator mounted on the fixed frame for receiving and accumulating multiple spacing sticks, spaced drop gates attached to the fixed frame below the accumulator, a carriage assembly movably mounted on the fixed frame and fitted with parallel chain channels provided with positioner chains having spaced positioner chain cleats for receiving spacing sticks from the accumulator and drop gates and multiple, spaced retainer arm assemblies and diverter assemblies attached to the chain channels. The retainer arm assemblies are equipped with retainer arms programmed with the diverter assemblies for retaining the spacing sticks on the respective positioner chain cleats until the proper time arrives for sequentially displacing the spacing sticks from selected ones of the positioner chain cleats and relocating the spacing sticks in selected spaced relationship on successive stacks of lumber located beneath the stick laying apparatus.

Still another object of this invention is to provide an automatic stick laying apparatus which is characterized by a fixed frame, an accumulator mounted on the fixed frame for receiving and accumulating multiple spacing sticks, spaced drop gates attached to the fixed frame below the accumulator, a carriage assembly movably mounted on the fixed frame and fitted with parallel chain channels provided with positioner chains having spaced positioner chain cleats for receiving spacing sticks from the accumulator and drop gates and multiple, spaced diverter assemblies and retainer arm assemblies attached to the chain channels and orchestrated for sequentially pivoting into the path of selected ones of the spacing sticks, and sliding the spacing sticks to the edges of the positioner chain cleats while retaining the spacing sticks on the edges of the positioner chain cleats, respectively, and subsequently relocating the spacing sticks in selected spaced relationship on successive stacks of lumber located beneath the stick laying apparatus by advancement of the positioner chains.

A still further object of this invention is to provide an automatic, computer-operated stick laying apparatus which utilizes a pair of vertically adjustable, horizontal, endless accumulator chains mounted on a fixed frame and fitted with spaced accumulator chain cleats for accumulating a supply of spacing sticks from a stick supply device, drop gates mounted on the fixed frame beneath the accumulator, a pair of vertically adjustable positioner chain channels horizontally mounted on the fixed frame and receiving a pair of spaced endless positioner chains provided with spaced positioner chain cleats and fitted with a pair of companion advancing chains, for receiving spacing sticks in a selected sequence from the accumulator through the drop gates and carrying the spacing sticks into proper positions above stacked tiers of lumber located beneath the stick laying apparatus, where the spacing sticks are maintained on the respective positioner chain cleats. The computer-operated stick laying apparatus further includes spaced diverter assemblies and retainer arm assemblies located between the positioner chain channels in spaced relationship for sequentially displacing the spacing sticks on selected positioner chain cleats while preventing the spacing sticks from prematurely exiting the positioner chain cleats, respectively. Corresponding release of the spacing sticks from the positioner chain cleats is effected by sequential limited advancement of the positioner chains, to position the displaced spacing sticks in a selected spacing on successive layers of lumber and vertically space the layers of lumber for drying purposes.

Another object of this invention is to provide a method for automatically placing spacing sticks in a selected pattern on successive tiers of stacked wood products such as lumber, plywood or the like, which method includes the steps of spacing the spacing sticks in a horizontally-positioned, endless chain accumulator, sequentially dropping the spacing sticks through adjacent gates to locations between parallel sets of spaced positioner chain cleats attached to a pair of horizontal endless positioner chains located above the lumber, locating the spacing sticks over the lumber by operation of the positioner chains, maintaining the spacing sticks on the positioner chain cleats by operation of spaced retainer arm assemblies, causing selected spacing sticks to be displaced to preselected positions on the positioner chain cleats by operation of spaced diverter assemblies, lowering the positioner chains and spacing sticks to a point immediately over the top layer of lumber, and advancing the positioner chains to deposit the spacing sticks in the selected pattern on the lumber, repositioning the retainer arm assemblies and diverter assemblies into the pre-diverting configuration and raising the positioner chains to receive additional spacing sticks from the accumulator.

A further object of this invention is to provide a method for placing spacing sticks on tiers of lumber in a selected pattern or spacing, wherein the spacing sticks are loaded from a stick supply apparatus on a horizontal accumulator between adjacent sets of parallel accumulator chain cleats. The sticks are then selectively distributed to empty positioner chain cleats located on a pair of horizontal endless positioner chains through spaced drop gates and the positioner chains next automatically locate the spacing sticks in proper orientation over the lumber. Spaced diverter assemblies and retainer arm assemblies then operate to displace the spacing sticks on the positioner chain cleats and prevent the spacing sticks from prematurely exiting the positioner chain cleats, respectively. The carriage assembly is then lowered to a point immediately over the top layer of lumber as the spaced retainer arm assemblies maintain the spacing sticks on the chain cleats, where preselected numbers of spacing sticks are displaced from corresponding chain cleats by operation of the selected diverter assemblies as the positioner chains are advanced a short distance, to place the sticks on the lumber in the selected pattern. The retainer arm assemblies and diverter assemblies are then repositioned and the carriage assembly is raised to receive additional spacing sticks.

SUMMARY OF THE INVENTION

These and other objects of the invention are provided in a new and improved automatic stick laying apparatus and method for laying spacing sticks on successive tiers of lumber, which apparatus includes a fixed frame and a carriage assembly slidably mounted on the fixed frame above an area where lumber is to be stacked. The fixed frame further supports a stick supply apparatus which interfaces with a pair of horizontally-spaced, endless accumulator chains fitted with accumulator chain cleats for accumulating spacing sticks and multiple, spaced, programmable controller-operated, cylinder-actuated drop gates located beneath the accumulator chains. A pair of spaced, parallel chain channels, fitted with corresponding endless positioner chains, are located on the carriage assembly beneath the accumulator chains and drop gates and the positioner chains are provided with spaced chain cleats For sequentially receiving the spacing sticks by operation of the drop gates. Advancing chains are also provided in the carriage assembly and operate with the positioner chains and a pair of rubber discs to seat the spacing sticks on the positioner chain cleats for transporting the spacing sticks to preselected positions over the lumber to be stacked. Multiple cylinder-actuated diverter assemblies, cooperating with corresponding retainer arm assemblies, all mounted in spaced relationship on the positioner chain channels and controlled by programmable controller, computer, or alternative control devices, operate to displace and stabilize, respectively, the spacing sticks on "the chain cleats during lowering of the carriage assembly, after which the positioner chains are advanced in sequence to deposit the spacing sticks in spaced relationship on the underlying tiers of lumber to vertically space the lumber in stacked layers.

BRIEF DESCRIPTION OF THE DRAWINGS

The invention will be better understood by reference to the accompanying drawings, wherein:

FIG. 3A is a sectional view taken along line 3A—3A of one set of the diverter assemblies and retainer arm assemblies illustrated in FIG. 3;

FIG. 8 is a series of sectional positional views, more particularly illustrating a preferred operation of the diverter assemblies and retainer arm assemblies and the automatic stick laying apparatus illustrated in FIG. 1-7; and FIG. 9 is a schematic diagram of a typical leg cylinder and retainer arm cylinder of a diverter assembly and a retainer arm assembly coupled to a solenoid valve, more particularly illustrating a preferred operation of the diverter assemblies and retainer arm assemblies of the automatic stick laying apparatus.

DESCRIPTION OF THE PREFERRED EMBODIMENTS

Figure 1:
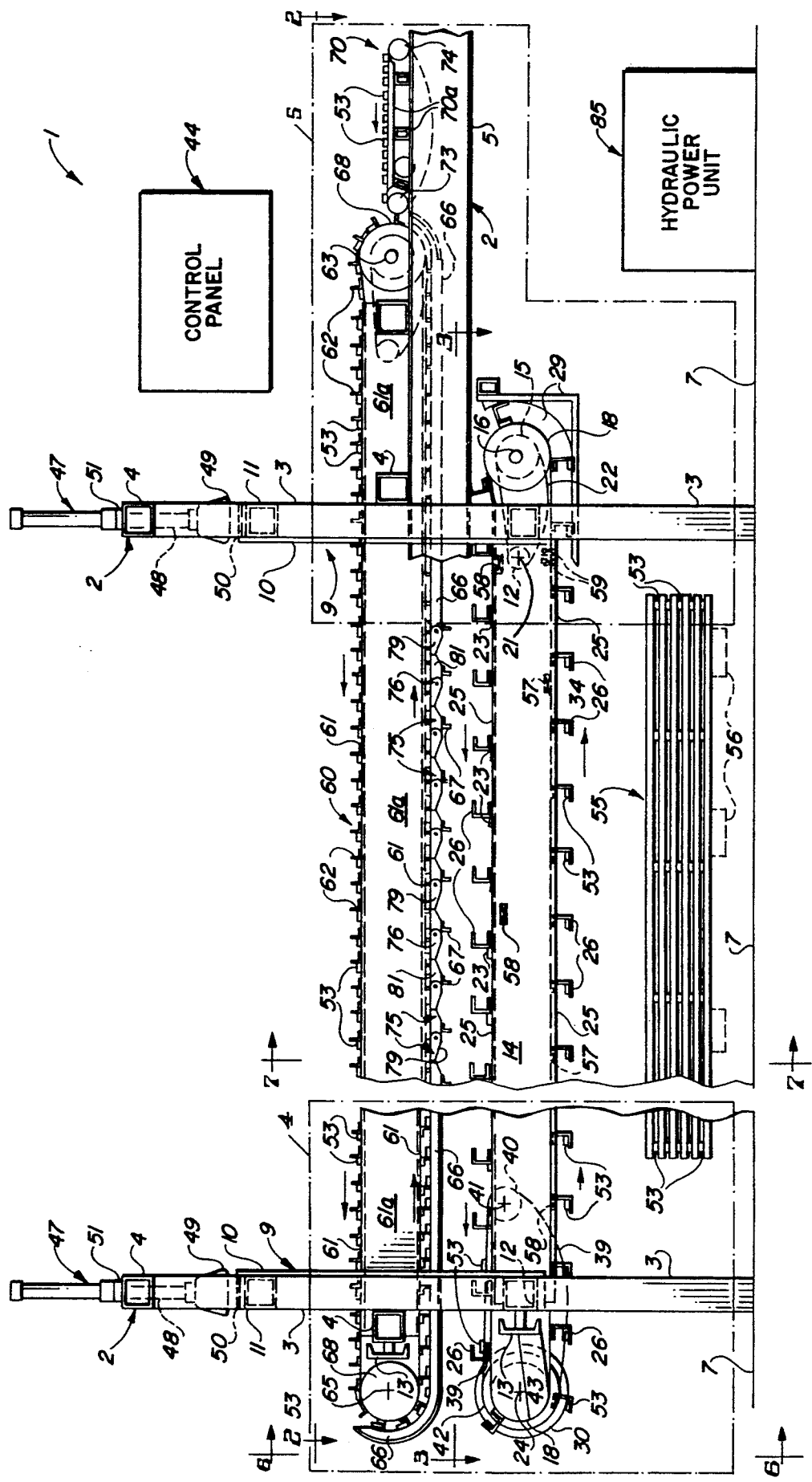
FIG. 1 is a side view, partially in section, of a preferred embodiment of the automatic stick laying apparatus of this invention.

Referring initially to FIGS. 1—3 and 6 of the drawings, in a preferred embodiment the automatic stick laying apparatus of this invention is generally illustrated by reference numeral 1. The stick laying apparatus 1 is characterized by a frame 2, fitted with vertical frame legs 3, frame end braces 4 and frame side beams 5, oriented over stacked tiers of lumber 55, separated by spacing sticks 53 and resting on lumber supports 56. The frame legs 3 and lumber supports 56 are resting on a supporting surface 7, such as concrete, metal or other material. A carriage assembly is generally illustrated by reference numeral 9 and is mounted on the frame legs 3 of the frame 2 in vertically slidable relationship by means of four carriage guides 10. The carriage guides 10 are separated by a pair of horizontal top carriage braces 11 and bottom carriage braces 12, respectively, and two sets of positioner chain channels 14 are disposed in spaced, parallel, facing relationship on the spaced bottom carriage braces 12, as further illustrated in FIGS. 1-3 and 6. It will be appreciated by those skilled in the art that the positioner chain channels 14 may be welded or otherwise secured to the bottom carriage braces 12, further according to the knowledge of those skilled in the art. As further illustrated in FIGS. 1 and 6, a pair of lift cylinders 47 are mounted on the frame end braces 4 by means of lift cylinder mount brackets 51, respectively, and the corresponding cylinder piston rods 48 of the lift cylinders 47 project vertically downwardly and receive a rod clevis 49. Each rod clevis 49 is attached to a clevis bracket 50, bolted or welded to the corresponding top carriage brace 11, for securing the respective cylinder pistons 48 to the top carriage braces 11 in the carriage assembly 9, as further illustrated in FIGS. 1 and 6. Accordingly, it will be appreciated that the entire carriage assembly 9, carriage guides 10, top carriage braces 11, bottom carriage braces 12 and positioner chain channels 14 may be vertically adjusted with respect to the frame 2 and the lumber 55 by operation of the lift cylinders 47 in concert, as further hereinafter described.

Referring now to FIGS. 1-3 and 5 of the drawings, a shaft drive sprocket 15 is mounted on a positioner chain drive sprocket shaft 16, disposed between corresponding ends of the positioner chain channels 14 and mounted on the bottom carriage brace 12 at the drive end of the carriage assembly 9. The positioner chain drive sprocket shaft 16 is journalled for rotation in this position by a pair of shaft bearings 17, mounted on the bottom carriage brace 12, which is welded, bolted or otherwise secured to the corresponding carriage guides 10, respectively. A pair of positioner chain sprockets 18 are also attached to the positioner chain drive shaft 16 in spaced relationship and in alignment with the respective spaces between each of the two sets of positioner chain channels 14, as further illustrated in FIG. 3. A positioner chain drive motor 20 is mounted to one of the bottom carriage braces 12 by means of a bracket (not illustrated) to align the corresponding drive motor sprocket 21 with the shaft drive sprocket 15 and facilitate connection of the shaft drive sprocket 15 to the drive motor sprocket 21 in driving relationship by means of a drive chain 22. A stick return guide 29 is welded to the carriage guides 10 and spans the drive end of the carriage assembly 9. A positioner chain idler shaft 24 is journalled for rotation at the opposite or idler end of the carriage assembly 9 by means of another pair of shaft bearings 17, mounted on a shaft mount channel 13, secured to the bottom carriage brace 12, as further illustrated in FIGS. 1 and 3. A pair of positioner chain sprockets 18 are secured to the positioner chain idler shaft 24 in spaced relationship between the respective sets of positioner chain channels 14 in alignment with the corresponding positioner chain sprockets 18, mounted on the positioner chain drive sprocket shaft 16 at the drive end of the carriage assembly 9. A pair of positioner chains 25 are mounted on the respective aligned sets of positioner chain sprockets 18 between the corresponding spaced sets of positioner chain channels 14 and are driven in parallel, spaced relationship by operation of the positioner chain drive motor 20 and rotation of the positioner chain drive shaft 16 and positioner chain idler shaft 24. A series of spaced nib plates 23 are welded to the positioner chain channels 14 as illustrated in FIG. 1 and project into the path of travel of the spacing sticks 53, to orient the spacing sticks 53 such that the widest cross-sectional dimension of the spacing sticks 53 is resting on the positioner chains 25, as hereinafter described.

Figure 3:
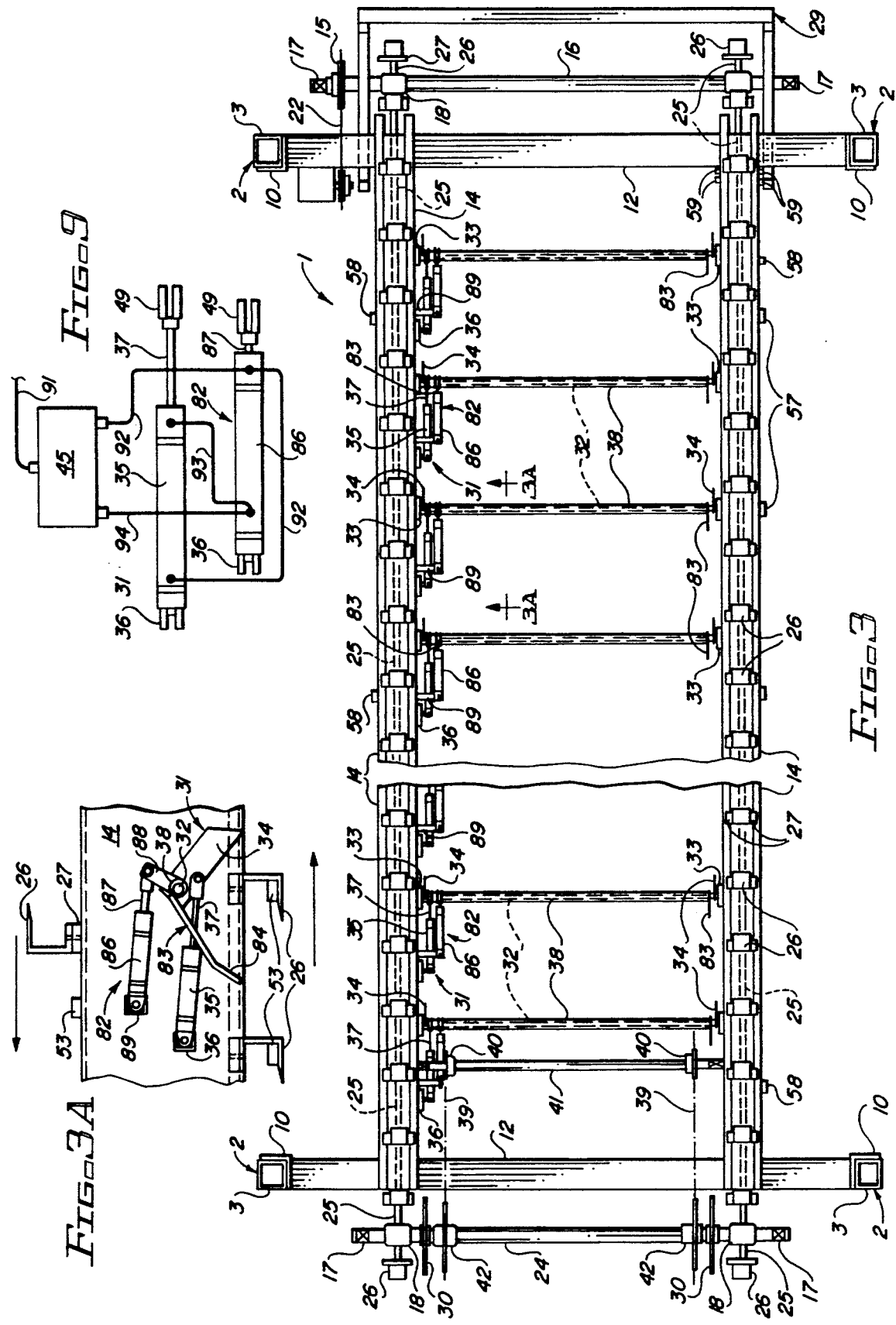
FIG. 3 is a sectional view, taken along line 3—3 of the automatic stick laying apparatus illustrated in FIG. 1, more particularly illustrating the diverter assemblies and retainer arm assemblies.
Figure 4:
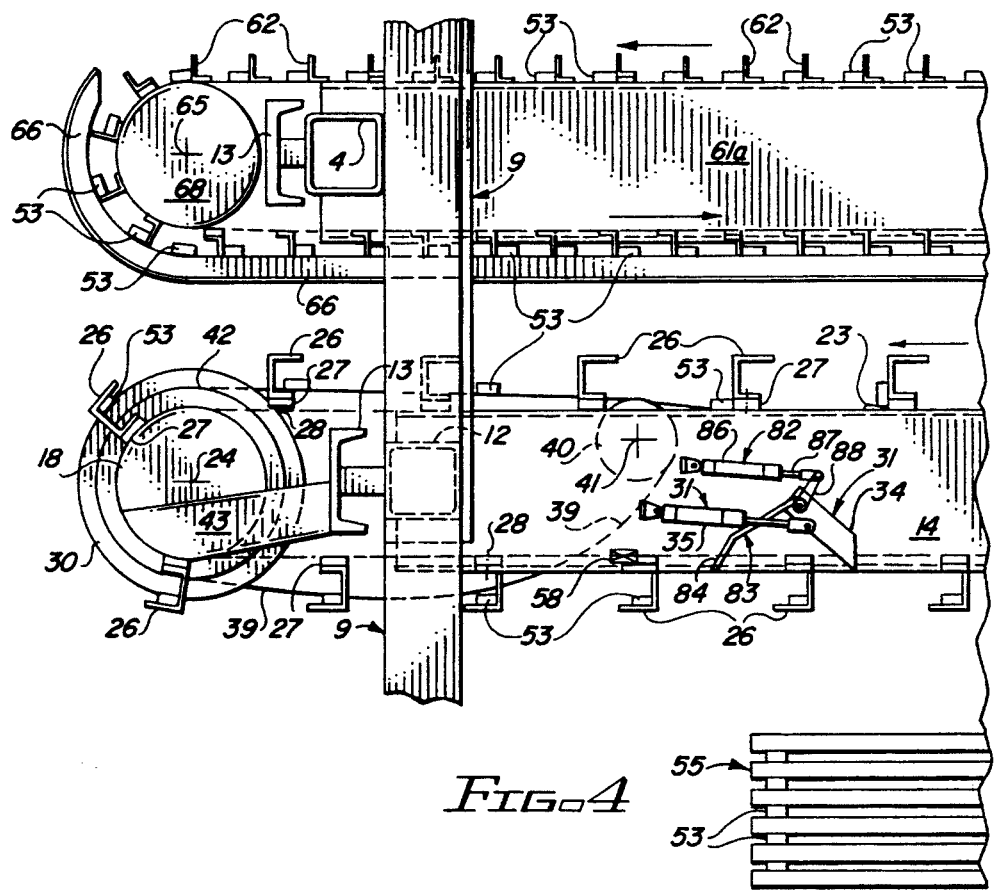
FIG. 4 is a side view of the idler end of the automatic stick laying apparatus illustrated in FIG. 1, further illustrating a set of the diverter assemblies and retainer arm assemblies.

As further illustrated in FIGS. 1, 3 and 4, in a preferred embodiment of the invention a pair of large advancing chain sprockets 42 are mounted in spaced relationship on the positioner chain idler shaft 24 and a small advancing chain shaft 41 is rotatably extended between the inboard facing ones of the positioner chain channels 14 in spaced, parallel relationship with respect to the positioner chain idler shaft 24. The small advancing chain shaft 41 is fitted with a pair of corresponding small advancing chain sprockets 40, which are aligned, respectively, with the large advancing chain sprockets 42. A pair of advancing chains 39 is mounted in parallel relationship on the corresponding aligned sets of small advancing chain sprockets 40 and large advancing chain sprockets 42, respectively, such that rotation of the positioner chain idler shaft 24 by operation of the positioner chain drive shaft 16 and positioner chain drive motor 20 also effects rotation of the parallel advancing chains 39. The advancing chains 39 are oriented to project above the path of the positioner chains 25 at the idler end of the carriage assembly 9, as illustrated in FIG. 1 and the sizes of the small advancing chain sprockets 40 and large advancing chain sprockets 42 are chosen to cause the advancing chains 39 to move faster than the positioner chains 25, for purposes which will be hereinafter further described. A rubber disc 30 is mounted on the positioner chain idler shaft 24 between each set of positioner chain sprockets 18 and large advancing chain sprockets 42, for clamping the spacing sticks 53 in place on the respective positioner chain cleats 26, mounted on the positioner chains 25, as illustrated in FIG. 3 and as further hereinafter described.

Figure 5:
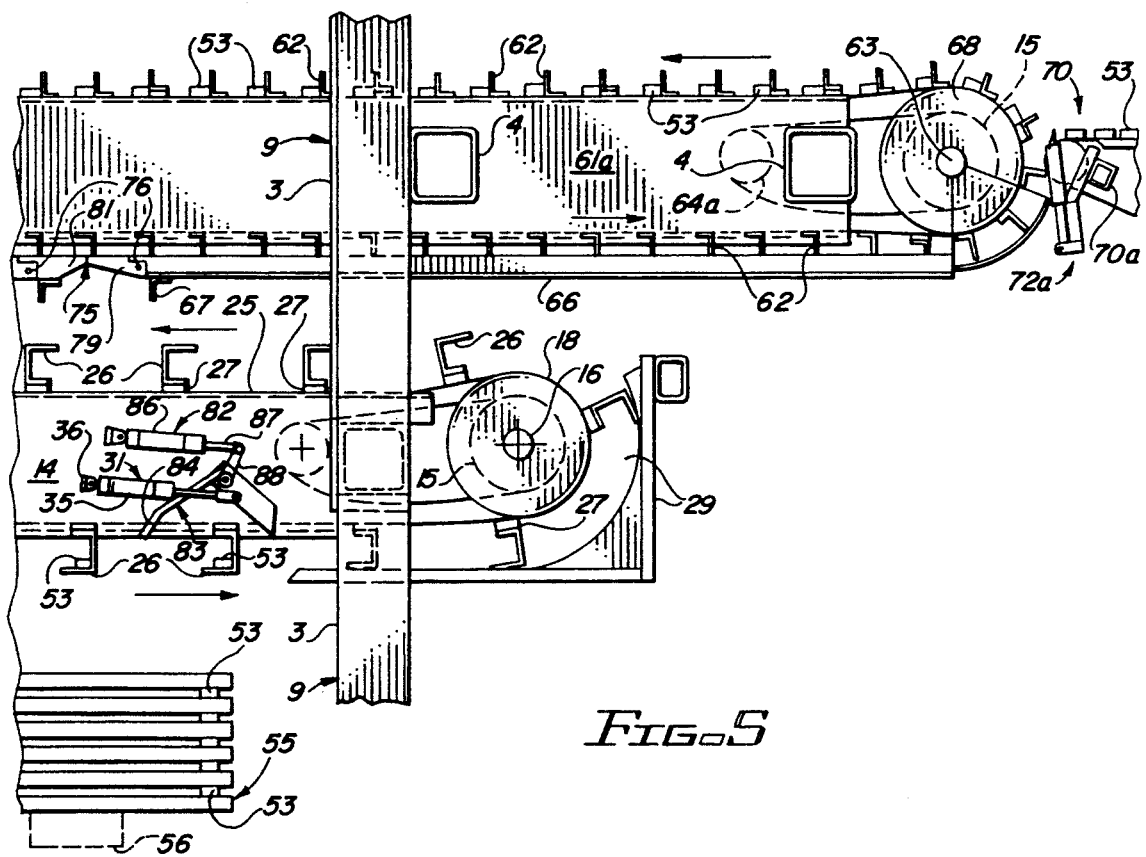
FIG. 5 is a side view of the drive end of the automatic stick laying apparatus illustrated in FIG. 1, still further illustrating a set of the diverter assemblies and retainer arm assemblies.
Figure 6:
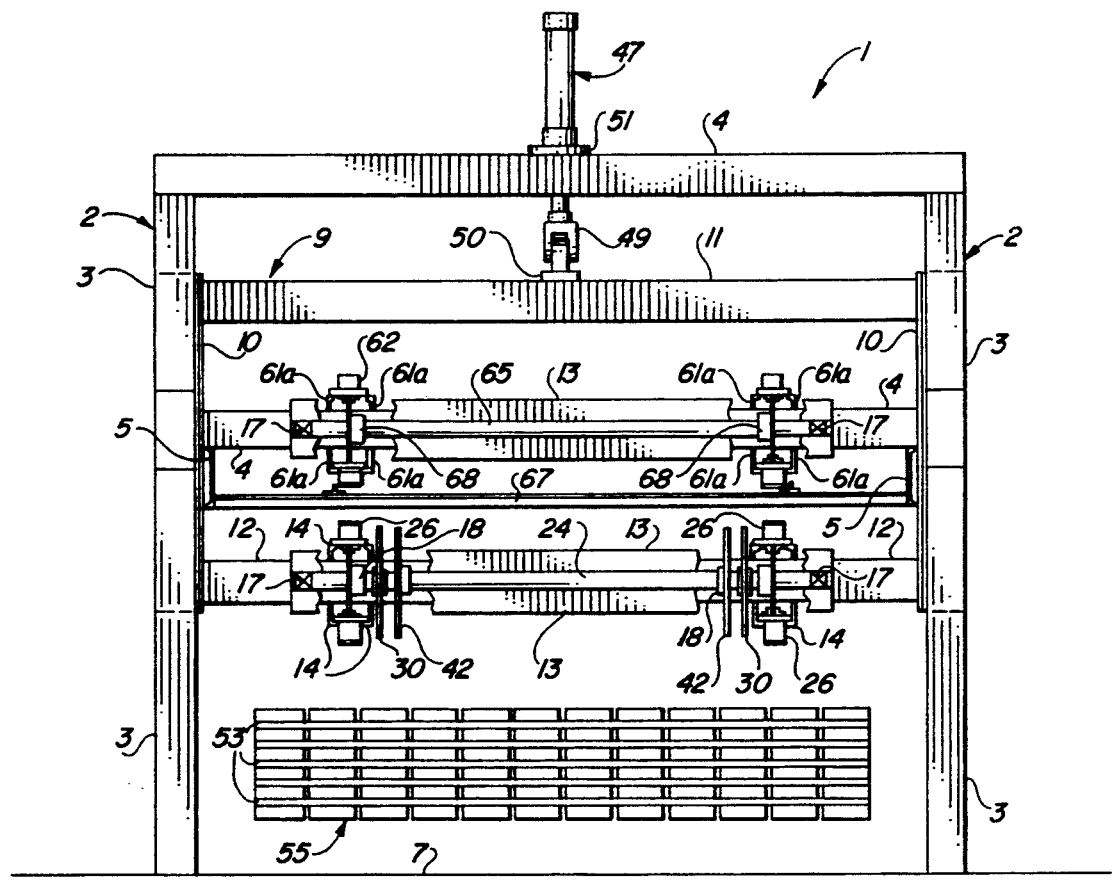
FIG. 6 is an end view of the idler end of the automatic stick laying apparatus illustrated in FIG. 1.

In another preferred embodiment of the invention, the multiple L-shaped positioner chain cleats 26 are mounted in spaced, parallel, aligned sets on each of the positioner chains 25 by means of cleat slides 27 and corresponding cleat bolts 28, as illustrated in FIGS. 3, 4 and 5. The cleat slides 27 may be constructed of any suitable material, but in a most preferred embodiment of the invention are constructed in one piece in the positioner chain cleats 26 and are fabricated of wood or plastic such as polyethylene or polypropylene. The cleat slides 27 are designed to contact the channel flanges of the parallel positioner chain channels 14 and slide on the horizontal channel flanges as the positioner chains 25 traverse the positioner chain channels 14 responsive to operation of the positioner chain drive motor 20, as illustrated in FIG. 3. The direction of rotation of the positioner chains 25 is counterclockwise, as indicated by the arrows, when the stick laying apparatus 1 is viewed as indicated in FIGS. 1 and 4. In a most preferred embodiment of the invention a pair of chain deflectors 43 are mounted on a shaft mount channel 13 at the idler end of the carriage assembly 9 in alignment with and engaging the positioner chains 25, respectively, for stabilizing the positioner chains 25.

Figure 7:
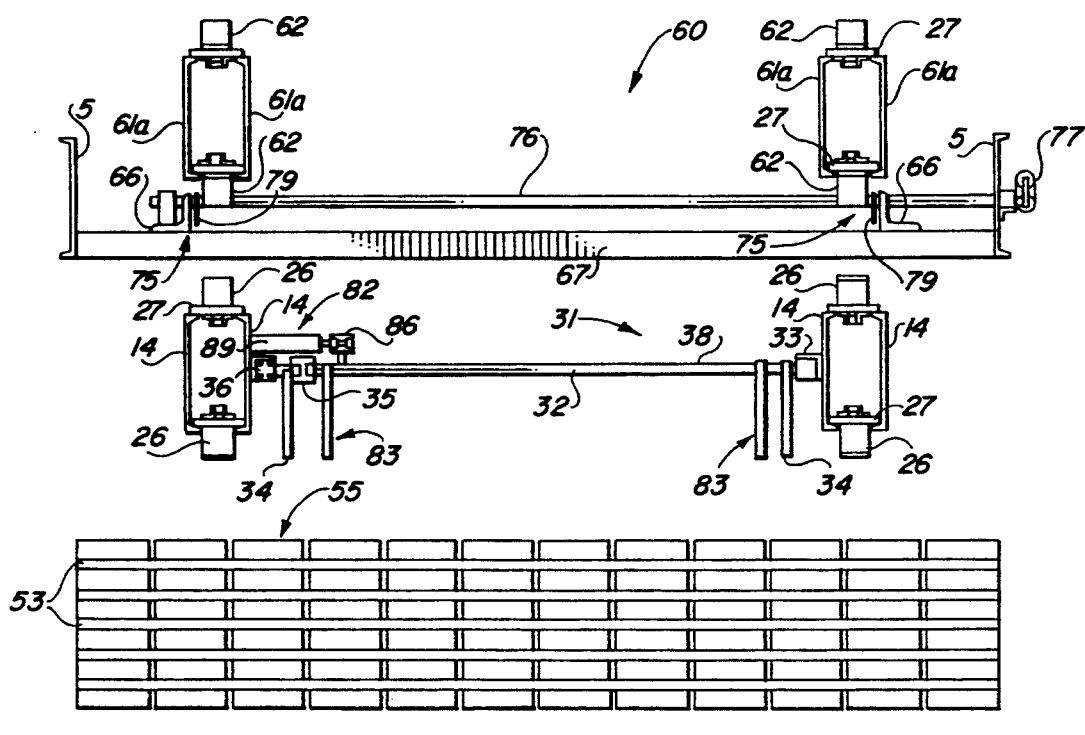
FIG. 7 is a sectional view, taken along line 7—7 of the automatic stick laying apparatus illustrated in FIG. 1, more particularly illustrating the diverter assemblies and retainer arm assemblies.

Referring now to FIGS. 3, 3A, 4, 5 and 7 of the drawings, multiple, spaced diverter assemblies 31 are located between the respective positioner chain channels 14. Each of the diverter assemblies 31 is characterized by a diverter bar 32, journalled for rotation in spaced diverter bar bearings 33, mounted in the inboard ones of the respective parallel sets of positioner chain channels 14, as illustrated in FIGS. 3 and 7, and a contact leg 34 projecting downwardly from each diverter bar 32, as illustrated in FIGS. 3, 3A and 7. A leg cylinder 35 is mounted on a corresponding cylinder mount bracket 36, attached to one of the inboard positioner chain channels 14 and the leg cylinder piston rod 37 of each of the leg cylinders 35 is pivotally attached to the contact leg 34 in spaced relationship with respect to the point where the contact leg 34 is attached to the diverter bar 32, respectively. Accordingly, it will be appreciated from a consideration of FIGS. 3–7 that operation of the respective leg cylinders 35 in the diverter assemblies 31 to retract the leg cylinder piston rods 37 causes the corresponding contact leg 34 to pivot downwardly toward the horizontal plane of motion of the positioner chain cleats 26 and extension of the leg cylinder piston rod 37 effects pivotal extension of the respective contact legs 34 upwardly above the plane of motion of the positioner chain cleats 26. As particularly illustrated in FIG. 3A, multiple, spaced retainer arm assemblies 82 are also located between the respective positioner chain channels 14. Each of the retainer arm assemblies 82 includes a diverter bar sleeve 38, provided on the corresponding diverter bar 32 and a pair of piston rod connectors 88, welded or otherwise attached to the diverter bar sleeve 38 in spaced relationship. A retainer arm 83, terminated by a retainer arm finger 84, extends from the end of the piston rod connector 88 and a retainer arm cylinder piston rod 87 is pivotally attached to the opposite end of the piston rod connector 88 to pivot the retainer arm 83. A retainer arm cylinder 86 receives the retainer arm cylinder piston rod 87 and is secured to a retainer arm cylinder mount 89 by means of a cylinder mount bracket 36.

Referring to FIGS. 1–3A and 9 of the drawings, in a preferred embodiment of the invention orchestration of the respective diverter assemblies 31 and retainer arm assemblies 82 is effected by means of a programmable controller mounted in a control panel 44, which may be optionally attached to the carriage assembly 9 or free standing adjacent to the stick laying apparatus 1, as desired. It will be appreciated by those skilled in the art that the programmable controller is designed to effect a desired sequential operation of the lift cylinders 47, diverter assemblies 31 and retainer arm assemblies 82 to properly space the spacing sticks 53 on the respective tiers of lumber 55. This is accomplished by means of multiple solenoid valves 45, connected to retainer arm cylinder air lines 92, cylinder connecting air lines 93 and return air lines 94, which also connect the leg cylinder 35 and retainer and cylinder 86 of the respective diverter assemblies 31 and retainer arm assemblies 32, respectively. Typical of the programmable controllers which may be used to achieve this objective in the automatic stick laying apparatus 1 of this invention is the Allen Bradley SLC 500 series programmable controller. Accordingly, as further illustrated in FIG. 9, in a preferred operational mode, orchestration of the respective leg cylinders 35 and retainer arm cylinders 86 in the diverter assemblies 31 and retainer assemblies 82, is effected by the programmable controller and multiple solenoid valves 45, each of which receives a supply of air from a source (not illustrated) through a primary air supply line 91. Air is also routed to the piston and opposite ends of the retainer arm cylinder 86 and leg cylinder 35, respectively, by a retainer arm cylinder air line 92 and return air line 94. The piston end of the leg cylinder 35 is connected to the opposite end of the retainer arm cylinder 86. Accordingly, each solenoid valve 45 operates to supply air initially to the piston side of the retainer arm cylinder 86 and the leg cylinder 35, to retract the respective retainer arm cylinder piston rods 87 and leg cylinder piston rods 37. This action pivots the respective retainer spacing sticks 53 to displace the spacing sticks 53 a short distance on the respective positioner chain cleats 27 and maintain them in place until the spacing sticks 53 are lowered and finally displaced onto the lumber 55, as heretofore described. A second pulse of air returns the contact leg 34 and retainer arm 84 to their original positions.

Referring now to FIGS. 1, 2 and 4–7 of the drawings, spacing sticks 53 are sequentially fed to corresponding positioner chain cleats 26 of the two positioner chains 25 by operation of an accumulator 60. The accumulator 60 includes a pair of parallel side beams 5 and two sets of spaced accumulator chain channels 61a that mount a shaft drive sprocket 15 and a pair of accumulator sprockets 68, carried by an accumulator chain drive shaft 63. At the other end of the accumulator 60 a second pair of spaced accumulator sprockets 68 are mounted on an accumulator chain idler shaft 65, as illustrated. An accumulator chain drive motor 64 is secured to a frame end brace 4 of the frame 2 and is fitted with a motor shaft sprocket 64a and a drive chain 22, which communicates with the shaft drive sprocket 15. The accumulator chain drive shaft 63 and accumulator chain idler shaft 65 are journal led for rotation in corresponding shaft bearings 17, attached to the frame end braces 4. Multiple, spaced accumulator chain cleats 62 are provided on the respective accumulator chains 61 and are each provided with a cleat slide 27, attached to the accumulator chains 61 by means of a cleat bolt 28, respectively. Accordingly, the accumulator chain drive motor 64 cases the accumulator chains 61 to rotate with the accumulator chain drive shaft 63 and accumulator chain idler shaft 65 at opposite ends of the frame 2 above the positioner chains 25, as illustrated in FIGS. 1, 2 and 4–7.

Referring again to FIGS. 1, 2 and 4–8 and FIG. 2 in particular, multiple drop gates 75 are fitted in a gap provided in the stick support 66 beneath the accumulator 60. Each of the opposed, spaced sets of gates 79 of the drop gates 75 lies adjacent a corresponding spaced set of spacer end plates 81, mounted on spaced angle iron braces 67. Each drop gate 75 includes a pair of gates 79, connected to a common drop gate shaft 76, which extends horizontally from each gate 79 to the drop gate piston rod 78 of a corresponding drop gate cylinder 77. Accordingly, operation of the drop gate cylinders 77 according to a selected pre-programmed sequence causes selected ones of the pairs of gates 79 of the drop gates 75 to open and drop corresponding spacing sticks 53 from the accumulator chain cleats 62 in the accumulator 60 to the positioner chain cleats 26 of the underlying positioner chains 25. This loading of spacing sticks 53 on empty positioner chain cleats 26 mounted on the positioner chains 25 ensures that the positioner chain cleats 26 are each filled with a spacing stick 53 when the positioner chain cleats 26 are lowered in sequence to deposit the spacing sticks 53 on the lumbar 55.

Figure 2:
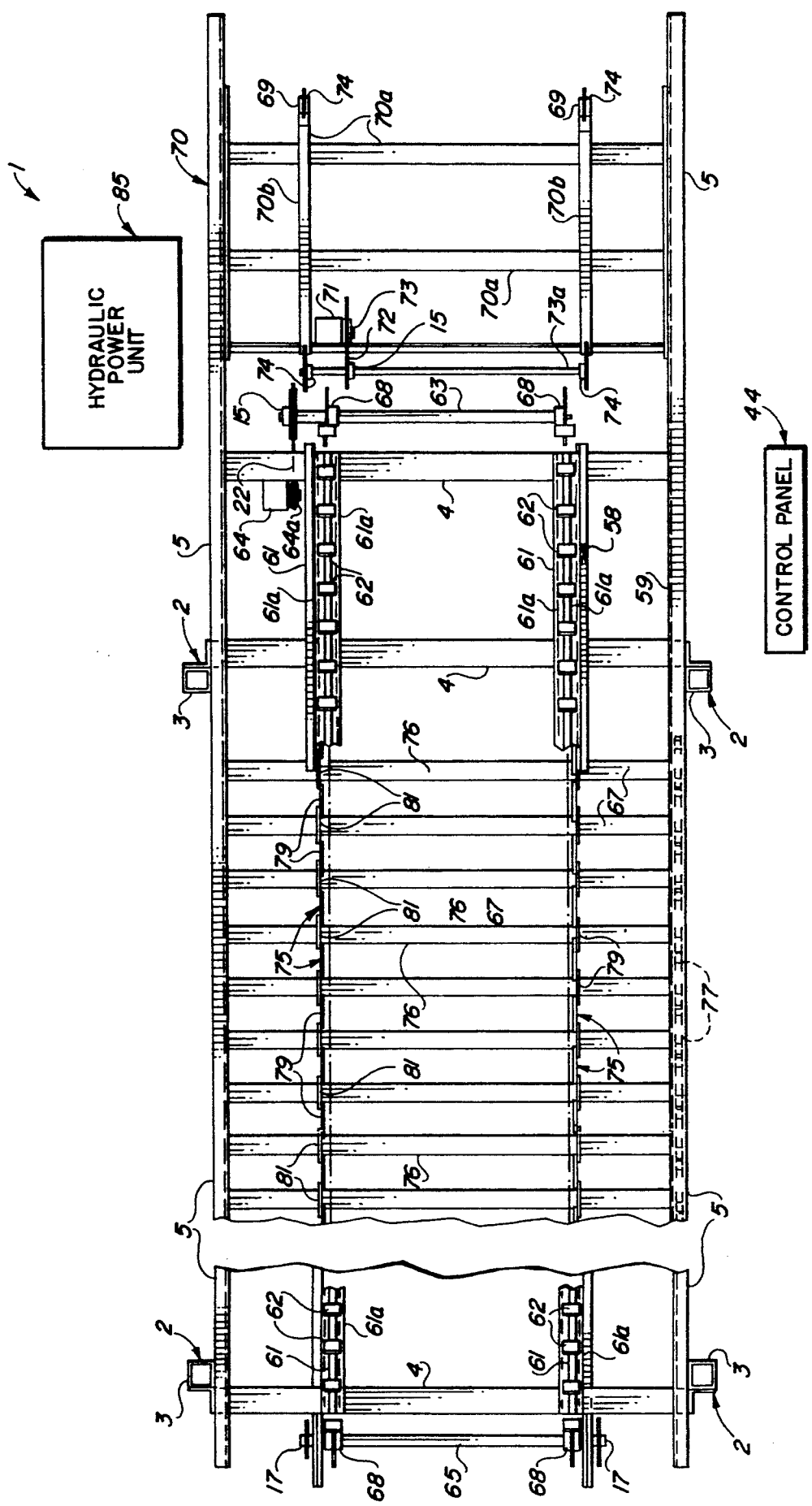
FIG. 2 is a top view of the automatic stick laying apparatus illustrated in FIG. 1.

Referring now to FIGS. 1, 2 and 5 of the drawings, a stick feeding apparatus is generally illustrated by reference numeral 70 and includes a feed frame 70a mounted on the side beams 5 at the stick-receiving end of the accumulator 60 for stockpiling a supply of the spacing sticks 53 and continuously feeding the spacing sticks 53 to the accumulator 60. The stick feeding apparatus 70 typically includes a stick feeder drive motor 71, having a feeder drive sprocket 73 that meshes with a stick feeder drive chain 72, which, in turn, meshes with a feeder drive sprocket 73 and a shaft drive sprocket 15, spaced from the feeder drive sprocket 73. A pair of feeder chains 70b are seated on spaced sets of feeder chain sprockets 74, rotatably mounted on the feeder chain drive shaft 73a and the individual sprocket shafts 69, respectively. Accordingly, a supply of spacing sticks 53 can be provided in a hopper or other collecting device (not illustrated) located in cooperation with the stick feeding apparatus 70 and fed from the hopper or collecting device sequentially in a crowded group against a feed cylinder 72a, illustrated in FIG. 5, onto the feeder chains 70b to feed the spacing sticks 53 continuously in spaced relationship onto the accumulator chain cleats 62 of the accumulator chains 61.

Referring again to FIG. 1, multiple, spaced chain monitoring photo cells 57 are spaced along the positioner chain channels 14 in spaced, oppositely-disposed pairs and and emit a beam of light through beam openings (not illustrated) located in the chain channels 14 to monitor the respective positioner chain cleats 26 and determine when the positioner chains 25 are elevated due to contact between the respective positioner chain cleats 26 and the top layer of lumber 55, as the carriage assembly 9 descends in the stick-laying operation. The carriage descent stops when the slacked positioner chains 25 interrupt the light beam between the oppositely-disposed emitter and receiver units of the respective pairs of chain monitoring photocells 57. A pair of proximity switches 58 is also mounted on one of the positioner chain channels 14, one of which proximity switches 58 beams downwardly near the idler end of the carriage assembly 9 to monitor the spacing sticks 53 located on the top tier of positioner chain cleats 26 and the other beaming upwardly near the drive end of the carriage assembly 9 to monitor the bottom tier of spacing sticks 53. The proximity switches 58 operate to determine whether a spacing stick 53 is located in each positioner chain cleat 26. If the monitored positioner chain cleat 26 is empty, the programmable controller "counts" the positioner chain cleat 26 spaces to the drop gates 75 and subsequently activates one or more drop gates 75 at the proper time to fill the empty positioner chain cleat(s) 26 with one or more spacing sticks 53 from the accumulator 60. An additional pair of chain advance photocells 59 is located on the positioner chain channels 14 at the drive end of the carriage assembly 9 to effect advancement of the positioner chains 25 in the final deposit of the spacing sticks 53 on the lumber 55, as hereinafter further described.

Referring now to FIGS. 1, 3A, 4, 5 and 8 of the drawings, the automatic stick laying apparatus i of this invention is operated in a first preferred mode as follows: The power unit 85, stick feeder drive motor 71, positioner chain drive motor 20, accumulator chain drive motor 64 and programmable controller in the control panel 44 are initially energized by manipulating one or more control switches (not illustrated). Spacing sticks 53 are then automatically crowded against the feed cylinder 72a and continuously fed from the stick feeding apparatus 70 to the accumulator 60. Subsequently, during each pause of the accumulator 60 and positioner chains 25 and at the upward position of the carriage assembly 9, the spacing sticks 53 are fed selectively through the drop gates 75 between spaced, parallel sets of positioner chain cleats 26 on the top segments of the positioner chains 25, which advance in programmed steps. As the respective spacing sticks 53 on the positioner chain cleats 26 approach the advancing chains 39 at the idler end of the carriage assembly 9, they eventually contact the advancing chains 39, which are moving faster than the positioner chains 25. Consequently, the spacing sticks 53 move rapidly forwardly and ultimately engage and rest on respective parallel sets of positioner chain cleats 26, as illustrated in FIG. 4. Accordingly, by the time each respective parallel set of positioner chain cleats 26 begins to move downwardly at the idler end of the carriage assembly 9, it contains a separate spacing stick 53, which is pinched between the carrying pair of positioner chain cleats 26 and the rubber discs 30, mounted on the positioner chain idler shaft 24 inboard of the positioner chain sprockets 18, as further illustrated in FIG. 4. The rubber discs 30 serve to grip the respective spacing sticks 53 and help rotate the spacing sticks 53 through 180 degrees with the respective carrying positioner chain cleats 26, to ensure that the widest cross-sectional dimension of the spacing sticks 53 rests on the respective horizontal cleat flanges as the spacing sticks 53 move linearly over the lumber 55. Parallel spacing sticks 53 then rest on the horizontal flanges of matching sets of positioner chain cleats 26 as the positioner chain cleats 25 and spacing sticks 23 continue to move in a clockwise rotation directly above the lumber 55. The chain deflectors 43, mounted on deflector brackets 43a, which are welded or otherwise attached to the bottom carriage brace 12 of the frame 2, operate to deflect each positioner chain 25 from the corresponding positioner chain sprockets 18, thereby sequentially releasing the spacing sticks 53 from the rubber discs 30 and stabilizing the positioner chains 25 and spacing sticks 53 from vibration or "chattering". In a first preferred spacing stick laying mode, during this linear movement of the spacing sticks 53 in a horizontal plane above the lumber 55 as illustrated in FIG. 8, position 1, the programmable controller in the control panel 44 has been programmed to sequentially energize the lift cylinders 47, illustrated in FIG. 5 and lower the carriage assembly 9 through position 1½, as indicated by the arrows, to position 2, both illustrated in FIG. 8. The programmable controller also simultaneously operates preselected and programmed electric solenoid valves 45, connected to corresponding leg cylinders 35 in the diverter assemblies 31 and retainer arm cylinders 86 in the retainer arm assemblies 82, respectively, as illustrated in FIG. 9 and heretofore described. This action effects pivotal movement of the respective sets of corresponding contact legs 34 and retainer arms 83 in the direction of the arrows illustrated in position 1½ and position 2, responsive to retraction of the leg cylinder piston rods 37 and retainer arm cylinder piston rods 87, respectively, from the orientation in positions 1 and 1½ to the configuration in position 2. This action also causes each set of contact legs 34 to engage a corresponding spacing stick 53 in spaced relationship as the positioner chains 25 advance and displace the spacing stick 53 on the horizontal flanges of the parallel sets of positioner chain cleats 26, to the edge of the respective horizontal flanges. The respective spacing sticks 53 are prevented from falling from tile corresponding positioner chain cleats 26 by the respective retainer arm fingers 94 of the retainer arms 83. The positioner chains 25 are then lowered as illustrated in position 2 until the light beam extending between opposite sets of the chain monitoring photocells 57 is interrupted by the positioner chains 25 as the positioner chain cleats 26 touch the top boards of the lumber 55. The positioner chains 25 are subsequently advanced for a short distance by operation of the chain advance photocells 59 to further displace the spacing sticks 53 from the positioner chain cleats 26 to the top surface of the top row or tier of lumber 55, as illustrated by the arrow in position 3 of FIG. 8, as the retainer arms 83 remain in the blocking configuration. The contact legs 34 and retainer arms 83 are then pivoted upwardly as illustrated by the arrow in position 4 and the carriage assembly 9 is raised through position 4½ and back into position 1 by operation of the lift cylinders 47, as further indicated by the arrows, according to the programming of the programmable controller.

A typical positioning of the spacing sticks 53 on lumber of various length as a function of positioner chain cleat 26 travel and the travel of the accumulator chain cleats 62 to refill empty positioner chain cleats 26 by operation of the drop gates 75, is set forth in the following table:

| Lumber Length (Ft.) | No. of Sticks Deposited | Adv. on Pos. Chains (Ft.) | Adv. on Acc. Chains (Ft.) |
| --- | --- | --- | --- |
| 8 | 5 | 5 | 1-8 inches |
| 10 | 6 | 7 | 2-4 inches |
| 12 | 7 | 7 | 2-4 inches |
| 14 | 8 | 9 | 3-4 inches |
| 16 | 9 | 9 | 3-4 inches |
| 18 | 10 | 11 | 3-8 inches |
| 20 | 11 | 11 | 3-8 inches |
| 22 | 12 | 13 | 4-4 inches |
| 24 | 13 | 13 | 4-4 inches |

Accordingly, by way of example, depositing 5 spacing sticks 53 on a stacked tier of lumber 55 eight feet in length requires a 5 foot advancement of the positioner chains 25 and a 1 foot 8 inch advancement of the accumulator chains 61 to effect reloading of 5 replacement spacing sticks 53 on the empty positioner chain cleats 26. The spacing stick placement illustrated in the table results in an equal spacing between each of the spacing sticks 53. However, it will be appreciated that any desired spacing of the spacing sticks 53, whether on equal or unequal centers, may be effected by programming and operating the programmable controller to achieve the desired spacing in the stick laying apparatus 1. Under circumstances where one or more spacing sticks 53 are not removed from one or more positioner chain cleats 26 during any of the spacing stick laying modes, the spacing stick(s) continue around the curved stick return guide 29, illustrated in FIG. 1, for a rerun over the lumber 55. Unexpended spacing sticks 53 located in the accumulator 60 are similarly recycled until needed, when they are dispensed to the positioner chains 25 by operation of the drop gates 75, as heretofore described.

It will be appreciated by those skilled in the art that the automatic stick laying apparatus I and associated assemblies of this invention may be driven by any electric or fluid-operated system, including electric, pneumatic and hydraulic systems and the like, as desired, the power system being represented by way of example in the drawing as a hydraulic power unit 85. Furthermore, for purposes of brevity, where a fluid-operated system is used, it is understood that the appropriate electrical, hydraulic, air and alternative fluid components such as pumps, hoses, couplings and fittings, as well as appropriate solenoid valves such as the solenoid valve 45, illustrated in FIG. 9, and like components, in non-exclusive particular, may be suitably coupled to the respective drop gate cylinders 77 in the drop gates 75, the leg cylinders 35 of the diverter assemblies 31, the retainer arm cylinder 86 of the retainer assemblies 82 and the lift cylinders 47 which operate the carriage assembly 9, in order to effectuate the purposes of the invention. Furthermore, appropriate electric lines and fittings, as well as alternative structural components may be provided in the stick laying apparatus 1 according to the knowledge of those skilled in the art, to facilitate optimum installation of the stick laying apparatus i in an existing lumber stacking operation.

It will also be appreciated by those skilled in the art that the automatic stick laying apparatus may be easily adapted, both in automatic mode by operation of a computer and/or a programmable controller or alternative control device, including manual mode, to the processing and handling of any flat wood product in lumber, plywood and pressboard mills, and the like. Moreover, because of the design feature which incorporates the advancing chains, irregular spacing sticks may be incorporated for use with reduced incidence of culling and the spacing sticks may be inserted between parallel sets of chain cleats with imprecision, without the necessity of precisely locating the spacing sticks on the positioner chain cleats themselves.

While the preferred embodiments of the invention have been described above, it will be recognized and understood that various modifications may be made in the invention and the appended claims are intended to cover all such modifications which may fall within the spirit and scope of the invention.

Having described by invention with the particularity set forth above, what is claimed is:

1. Apparatus for successively positioning sticks on layers of wood, comprising a frame; accumulator chain means rotatably carried by said frame on an accumulator chain axle in substantially horizontal, linearly advancing disposition for receiving the sticks by gravity in spaced relationship with respect to each other; drop gate means carried by said frame beneath said accumulator chain means; positioner chain means rotatably carried by said frame on a positioner chain axle beneath said drop gate means in substantially horizontal, linearly advancing disposition for selectively receiving sticks from said accumulator chain means by gravity responsive to operation of said drop gate means and transporting the sticks over the layers of wood along a path of travel; drive means operatively connected to said accumulator chain means and said positioner chain means in driving relationship; diverter means pivotally carried by said positioner chain means for selectively pivoting into the path of travel of the sticks and displacing the sticks from said positioner chain means onto the wood in a selected spacing responsive to advancement of said positioner chain means; stick retaining means pivotally carried by said positioner chain means for selectively pivoting into the path of travel of the sticks on said positioner chain means and preventing the sticks from prematurely exiting said positioner chain means prior to advancement of said positioner chain means, responsive to displacement of the sticks from said positioner chain means by said diverter means; and carriage assembly means vertically slidably carried by said frame and wherein said positioner chain means, said diverter means and said stick retaining means are mounted on said carriage assembly means.

2. The apparatus of claim 1 wherein said carriage assembly means further comprises a pair of carriage braces spanning each end of said frame, a plurality of carriage guides mounted on said carriage braces and slidably carried by said frame and spaced positioner chain channels disposed in horizontal orientation on said carriage braces and wherein said positioner chain means, said diverter means and stick retaining means are disposed between said positioner chain channels and further comprising at least one lift cylinder means operatively connected to each end of said frame and one of said carriage braces, respectively, for raising and lowering said carriage braces, said carriage guides, said positioner chain channels, said positioner chain means, said diverter means and said stick retaining means in concert on said frame.

3. The apparatus of claim 2 further comprising:
  (a) nib means provided on said positioner chain means in the path of the sticks for engaging the sticks and positioning the sticks uniformly on said positioner chain means;
  (b) advancing chain means carried by said positioner chain channel in rotatable linearly advancing disposition and extending above said positioner chain means substantially parallel to the path of travel of the sticks, said advancing chain means adapted to travel faster than said positioner chain means and engage the sticks for relocating the sticks on said positioner chain means, wherein the sticks are suspended in release configuration over the wood; and
  (c) resilient disc means rotatably carried by said positioner chain axle for clamping the sticks between said resilient disc means and said positioner chain means and preventing rotation of the sticks during travel of the sticks from the top portion of said positioner chain means to the bottom portion of said positioner chain means.

4. The apparatus of claim 1 further comprising nib means provided on said positioner chain means in the path of the sticks for engaging the sticks and positioning the sticks uniformly on said positioner chain means.

5. The apparatus of claim 1 further comprising advancing chain means carried by said carriage assembly means in rotatable linearly advancing disposition and extending above said positioner chain means substantially parallel to the path of travel of the sticks, said advancing chain means adapted to travel faster than said positioner chain means and engage the sticks for relocating the sticks on said positioner chain means, wherein the sticks are suspended in release configuration over the wood.

6. The apparatus of claim 1 further comprising resilient disc means rotatably carried by said positioner chain axle for clamping the sticks between said resilient disc means and said positioner chain means and preventing rotation of the sticks during travel of the sticks from the top portion of said positioner chain means to the bottom portion of said positioner chain means.

7. The apparatus of claim 1 further comprising:
(a) nib means provided on said positioner chain means in the path of the sticks for engaging the sticks and positioning the sticks uniformly on said positioner chain means;
(b) advancing chain means carried by said carriage assembly means in rotatable, linearly advancing disposition and extending above said positioner chain means substantially parallel to the path of travel of the sticks, said advancing chain means adapted to travel faster than said positioner chain means and engage the sticks for relocating the sticks on said positioner chain means, wherein the sticks are suspended in release configuration over the wood; and
(c) resilient disc means rotatably carried by said positioner chain axle for clamping the sticks between said resilient disc means and said positioner chain means and preventing rotation of the sticks during travel of the sticks from the top portion of said positioner chain means to the bottom portion of said positioner chain means.

8. The apparatus of claim 1 further comprising programmable controller means operably connected to said drop gate means, said diverter means and said stick retaining means for orchestrating operation of said drop gate means, said diverter means and said stick retaining means and locating the sticks on the wood in a selected spacing.

9. The apparatus of claim 8 further comprising carriage assembly means vertically slidably carried by said frame and wherein said positioner chain means, said diverter means and said stick retaining means are mounted on said carriage assembly means in vertically adjustable relationship with respect to the frame responsive to operation of said programmable controller means.

10. The apparatus of claim 9 further comprising:
(a) nib means provided on said positioner chain means in the path of the sticks for engaging the sticks and positioning the sticks uniformly on said positioner chain means;
(b) advancing chain means carried by said carriage assembly means in rotatable, linearly advancing disposition and extending above said positioner chain means substantially parallel to the path of travel of the sticks, said advancing chain means adapted to travel faster than said positioner chain means and engage the sticks for relocating the sticks on said positioner chain means, wherein the sticks are suspended in release configuration over the wood; and
(c) resilient disc means rotatably carried positioner chain axle for clamping the sticks between said resilient disc means and said positioner chain means and preventing rotation of the sticks during travel of the sticks from the top portion of said positioner chain means to the bottom portion of said positioner chain means.

11. The apparatus of claim 9 wherein said carriage assembly means further comprises a plurality of carriage guides slidably carried by said frame, brace means connecting said carriage guides and two sets of positioner chain channels disposed in spaced, horizontal orientation on said brace means and wherein said positioner chain means, said diverter means and said stick retaining means are disposed between said sets of positioner chain channels, respectively, and further comprising at least one lift cylinder means operably connected to each end of said frame and said carriage assembly means, said lift cylinder means also operably connected to said programmable controller means for raising and lowering said carriage guides, said positioner chain channels, said positioner chain means, said diverter means and said stick retaining means in concert on said frame responsive to operation of said programmable controller means.

12. The apparatus of claim 11 further comprising endless advancing chain means carried by said positioner chain channels and extending above said positioner chain means parallel to the path of travel of the sticks, said endless advancing chain means adapted to travel faster than said positioner chain means and engage the sticks for relocating the sticks on said positioner chain means, wherein the sticks are suspended in release configuration over the wood.

13. The apparatus of claim 12 further comprising nib means provided on said positioner chain means in the path of the sticks for engaging the sticks and positioning the sticks uniformly on said positioner chain means.

14. The apparatus of claim 13 further comprising resilient disc means rotatably carried by said positioner chain axles for clamping the sticks between said resilient disc means and said positioner chain means and preventing rotation of the sticks during travel of the sticks from the top portion of said positioner chain means to the bottom portion of said positioner chain means.

15. Apparatus for successively positioning spacing sticks on layers of stacked lumber, comprising a fixed frame; a pair of accumulator chains disposed in spaced, substantially parallel, horizontal and rotatable relationship on said fixed frame and a plurality of accumulator chain cleats carried by said accumulator chains in parallel, spaced sets for receiving the spacing sticks in spaced relationship; a plurality of normally closed, fluid-operated drop gates carried by said fixed frame beneath said accumulator chains in spaced relationship; a carriage assembly vertically slidably carried by said frame, said carriage assembly disposed over the lumber; a pair of rotatable positioner chains disposed in spaced, substantially parallel, substantially horizontal relationship on said carriage assembly beneath said accumulator chains and said drop gates and a plurality of positioner chain cleats carried by said positioner chains in parallel, spaced sets for sequentially receiving the spacing sticks from said accumulator chains and said drop gates, respectively, and transporting the spacing sticks over the lumber along a path of travel; drive meals mounted on said carriage assembly and operably connected to said accumulator chains and said positioner chains in driving relationship; a plurality of fluid-operated diverter means pivotally carried by said carriage assembly in spaced relationship between said positioner chains; and a plurality of stick retaining means pivotally carried by said carriage assembly in spaced relationship between said positioner chains, whereby said drop gates are operated to sequentially drop the spacing sticks from said accumulator chains to said positioner chains and fill said positioner chain cleats, said carriage assembly is lowered in sequence over the lumber, selected ones of said diverter means are pivotally operated to engage corresponding ones of the spacing sticks and reposition the spacing sticks on said positioner chain cleats for diversion to, the lumber in a preselected spacing responsive to limited advancement of said positioner chains and said stick retaining means are pivoted into the path of travel of the spacing sticks on said positioner chains and prevent premature exiting of the spacing sticks from said positioner chain cleats, respectively.

16. The apparatus of claim 15 further comprising programmable controller means operably connected to said carriage assembly, said drop gates, said diverter means and said stick retaining means for orchestrating operation of said carriage assembly, said drop gates, said diverter means and said stick retaining means and locating the spacing sticks on the lumber in a selected spacing.

17. The apparatus of claim 16 further comprising a pair of endless rotatable advancing chains carried by said carriage assembly in spaced relationship with respect to each other and extending above said positioner chains substantially parallel to the path of travel of the spacing sticks, said endless rotatable advancing chains adapted to travel faster than said positioner chains and engage the spacing sticks with said positioner chain cleats for relocating the spacing sticks on said positioner chain cleats, wherein the spacing sticks are suspended in release configuration over the lumber.

18. The apparatus of claim 17 further comprising a positioner chain axle provided in said carriage assembly and resilient disc means rotatably mounted on said positioner chain axle for clamping the spacing sticks between said resilient disc means and said positioner chain cleans, respectively, and preventing rotation of the spacing sticks during travel of the spacing sticks from the top portion of said positioner chains to the bottom portion of said positioner chains.

19. The apparatus of claim 18 further comprising spaced positioner chain channels carried by said carriage assembly on each side of said positioner chains and nib means provided on said positioner chain channels in the path of the spacing sticks for engaging the sticks and positioning the spacing sticks uniformly on said positioner chains.

20. The apparatus of claim 16 further comprising at least one fluid lift cylinder operably connected to each end of said frame and said carriage assembly, said fluid lift cylinder also operably connected to said programmable controller means for raising and lowering said carriage assembly responsive to operation of said lift cylinder and said programmable controller means.

21. The apparatus of claim 20 further comprising:
(a) a pair of endless rotatable advancing chains carried by said carriage assembly in spaced relationship with respect to each other and extending above said positioner chains substantially parallel to the path of travel of the spacing sticks, said endless rotatable advancing chains adapted to travel faster than said positioner chains and engage the spacing sticks for relocating the spacing sticks on said positioner chain cleats wherein the spacing sticks are suspended in release configuration over the lumber; and (b) a pair of resilient discs rotatably carried by said carriage assembly substantially in alignment with said positioner chains respectively, for clamping the spacing sticks between said resilient discs and said positioner chains and preventing rotation of the spacing sticks during travel of the spacing sticks from the top portion of said positioner chains to the bottom portion of said positioner chains.

22. The apparatus of claim 21 further comprising spaced positioner chain channels carried by said carriage assembly on each side of said positioner chains and nib means provided on said positioner chain channels in the path of the spacing sticks for engaging the spacing sticks and positioning the spacing sticks uniformly on said positioner chains.

23. A method of successively positioning spacing sticks in a selected spaced relationship, on tiers of lumber, comprising the steps of accumulating spacing sticks on spaced, oppositely-disposed pairs of accumulator chain cleats provided on a pair of spaced accumulator chains; operating a drop gate positioned beneath said accumulator chains and delivering the spacing sticks from said accumulator chain cleats to spaced, oppositely-disposed pairs of positioner chain cleats provided on a pair of positioner chains disposed over the lumber and beneath said drop gate and said accumulator chains; positioning the spacing sticks above the lumber along a path of travel by rotation of the positioner chains; lowering said positioner chains and said positioner chain cleats over the lumber; operating pivoting diverter assemblies from retracted mode into extended mode and repositioning the spacing sticks on selected ones of the positioner chain cleats; operating pivoting stick retaining assemblies from retracted mode into extended mode and retaining assemblies from retracted mode into extended mode and retaining the spacing sticks on said positioner chain cleats for a selected period of time; sequentially advancing said positioner chains and said positioner chain cleats for displacing the spacing sticks over the lumber; operating the diverter assemblies and stick retaining assemblies from extended mode into retracted mode, respectively; and raising said positioner chains and said positioner chain cleats.

24. The method according to claim 23 further comprising the step of locating a pair of advancing chains in the path of the spacing sticks and operating said advancing chains faster than said positioner chains for advancing the spacing sticks into contact with said positioner chain cleats.

25. The method according to claim 23 further comprising the step of operably connecting a programmable controller to said drop gate, said diverter assemblies and said stick retaining assemblies and operating said programmable controller to orchestrate operation of said drop gate, said diverter assemblies and said stick-retaining assemblies.

26. The method according to claim 23 further comprising the steps of:
(a) locating a pair of advancing chains in the path of the spacing sticks and operating said advancing chains faster than said positioner chains for advancing the spacing sticks into contact with said positioner chain cleats; and (b) operably connecting a programmable controller to said drop gate, said diverter assemblies and said stick retaining assemblies and operating said programmable controller to orchestrate operation of said drop gate, said diverter assemblies and said stick-retaining assemblies.

* * * * *